United States Patent
Choi et al.

(10) Patent No.: US 10,366,078 B2
(45) Date of Patent: Jul. 30, 2019

(54) DATA REDUCTION METHODS, SYSTEMS, AND DEVICES

(71) Applicants: Jaesik Choi, Ulsan (KR); Alexander Sim, San Ramon, CA (US)

(72) Inventors: Jaesik Choi, Ulsan (KR); Alexander Sim, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 303 days.

(21) Appl. No.: 14/555,365

(22) Filed: Nov. 26, 2014

(65) Prior Publication Data

US 2015/0149495 A1     May 28, 2015

Related U.S. Application Data (60) Provisional application No. 61/909,518, filed on Nov. 27, 2013.

(51) Int. Cl.
*G06F 16/24*     (2019.01)

(52) U.S. Cl.
CPC ................... *G06F 16/24* (2019.01)

(58) Field of Classification Search
CPC .............................. G06F 7/30386; G06F 16/24
USPC ........................................................... 707/758
See application file for complete search history.

(56) References Cited

U.S. PATENT DOCUMENTS

| | | | |
|---|---|---|---|
| 6,845,342 B1 * | 1/2005 | Basser | G01R 33/56341 |
| | | | 382/131 |
| 8,392,384 B1 * | 3/2013 | Wu | G06F 17/30156 |
| | | | 707/693 |
| 2008/0010330 A1 * | 1/2008 | Ide | G05B 23/024 |
| | | | 708/201 |
| 2009/0112586 A1 * | 4/2009 | Williams | G10L 15/01 |
| | | | 704/239 |
| 2010/0211690 A1 * | 8/2010 | Pakzad | H04N 21/4384 |
| | | | 709/231 |

(Continued)

OTHER PUBLICATIONS

NPL 5: Network Anomaly Detection Title: Network Anomaly Detection Based on Behavioral Traffic Pattern Recognition. Published in: Zurich Research Laboratory. IBM | Jul. 2006 | Network Anomaly Detection by Andreas Kind, Paul Hurley, Jeroen Massar and Xenofontas Dimitropoulos. p. 1-17.*

(Continued)

*Primary Examiner* — Hicham Skhoun
(74) *Attorney, Agent, or Firm* — Kwan & Olynick LLP (57) ABSTRACT

Systems, methods, and apparatus are disclosed herein for data pattern detection and data reduction. Devices include an input port configured to receive data values that include a plurality of data units. The devices may also include a data analyzer configured to determine a test statistic based on at least some of the plurality of data units, the test statistic indicating a degree of difference between a first data unit and at least a second data unit, the second data unit being received at the input port before the first data unit. The data analyzer includes the first data unit in a first data block responsive to a determination that the test statistic indicates a low degree of difference, the determination being based on a comparison with a designated difference threshold, the first data block being a same data block as a second data block that includes the second data unit.

20 Claims, 7 Drawing Sheets

(56) References Cited

U.S. PATENT DOCUMENTS

2014/0328196 A1* 11/2014 Arad ............... H04L 41/147
370/252

OTHER PUBLICATIONS

NPL1: Intrusion Detection System using Fuzzy Logic Title: Intrusion Detection System using Fuzzy Logic by Alma Husagic Selman, Southeast Europe Journal of Soft Computing. Mar. 2013. p. 1-7.*
NPL 2: Improved Intrusion Detection System using Fuzzy LogicTitle: Improved Intrusion Detection System using Fuzzy Logic for Detecting Anamoly andMisuse type of Attacks.Published in: 2009 International Conference of Soft Computing and Pattern Recognitionby: Bharanidharan Shanmugam, and Norbik Bashah Idrispp. 1-6.*
NPL 3: Packet-based Input Test Data Compression Techniques (2002)Title: Packet-based Input Test Data Compression Techniques. Published in: Test Conference, 2002. Proceedings. Internationalby Erik H. Volkerink, Ajay Khoche and Subhasish MitraDate of Conference: Oct. 10-10, 2002 Date Added to IEEE Xplore: Dec. 10, 2002.*
NPL 4: Network intrusion detection using data mining and network behaviors analysisTitle: Network intrusion detection using data mining and network behaviors analysis.Published in: International Journal of Computer Science & Information Technology (IJCSIT) vol. 3, No. 6, Dec 2011by Ahmed Youssef and Ahmed Emam.*
Carbonetto, Peter et al., "Nonparametric Bayesian Logic", Proceedings of the twenty-first conference annual conference on uncertainty in artificial intelligence, AUAI press, 2005, pp. 85-93.
Chu, Wei et al., "Relational Learning with Gaussian Proces", NIPS, 2006, pp. 289-296.
Claise, B., "Cisco Systems NetFlow Services Export Version 9", RFC 3954 (Informational), Oct. 2004, 41 pgs.
Claise, B. et al., "Packet Sampling (PSAMP) Protocol Specifications", RFC 5476 (Proposed Standard), Mar. 2009, 45 pgs.
Csato, Lehel et al., "Sparse Online Gaussian Processes", Neutral computation, 14(3), 2002, pp. 641-668.
De Finetti, B., "Theory of Probability", John Wiley and Sons, 1974, 2 pgs.
De Salvo Braz, Rodrigo et al., "Lifted First-Order Probabilistic Inference", IJCAI, 2005, pp. 1319-1325.
Ferguson, Thomas S., "A Bayesian Analysis of Some Nonparametric Problems", The Annals of Statistics, 1(2), 1973, pp. 209-230.
Jordan, Michael I. et al., "An Introduction to Variational Methods for Graphical Models", Machine Learning, 37(2), Kluwer Academic Publishers, 1999, pp. 183-233.
Ryll-Nardzewski, G., "On Stationary Sequences of Random Variables and the De Finetti's Equivalence", Colloquium Mathematicae, 4(2), 1957, pp. 149-156.
Smola, Alex J. et al., "Sparse Greedy Matrix Approximation for Machine Learning", Proceedings of the Seventeenth International Conference on Machine Learning, ICML, 2000, pp. 911-918.
Teh, Yee W. et al., "Hierarchical Dirichlet Processes", Journal of the American Statistical Association, 101(476), 2006, pp. 1566-1581.
Xu, Zhao et al., "Multi-relational learning with gaussian processes", IJCAI, 2009, pp. 1309-1314.
Wainwright, Martin J. et al., "Graphical Models, Exponential Families, and Variational Inference", Foundations and Trends in Machine Learning, 1(1-2), 2008, 305 pgs.

* cited by examiner

DATA REDUCTION METHODS, SYSTEMS, AND DEVICES

CROSS-REFERENCE TO RELATED APPLICATIONS

This application claims the benefit under 35 U.S.C. § 119(e) of U.S. Provisional Patent Application No. 61/909,518, filed on Nov. 17, 2013 which is incorporated herein by reference in its entirety for all purposes.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to data reduction and data pattern detection and more particularly to data reduction and data pattern detection in the context of streaming data.

BACKGROUND

Large streaming data is utilized in the contexts of science and engineering experiments as well as computational simulations, such as nuclear fusion simulations. Furthermore, large streaming data may be utilized in the context of network communications as data is passed over a communications network. In general it is not possible to store, compute, search, and retrieve large streaming data due to the high data volume and the high frequency of the data generation. For example, many network devices collect network traffic monitoring logs. In high-speed networks, the collected network traffic monitoring data grows and aggregates rapidly resulting in a large amount of data that may change faster than conventional techniques can process. Accordingly, conventional techniques for analyzing and performing an in-depth network analysis remain limited.

SUMMARY

Disclose herein are systems, methods, and devices for data pattern detection and data reduction of streaming data. In various embodiments, devices may include an input port configured to receive a plurality of data values, where the plurality of data values includes a plurality of data units. The devices may also include a data analyzer configured to determine a test statistic based on at least some of the plurality of data units, the test statistic characterizing a data pattern that is represented by a degree of difference between a first data unit of the plurality of data units and at least a second data unit of the plurality of data units, and the second data unit being received at the input port before the first data unit. The data analyzer may be further configured to include the first data unit in a first data block in response to a determination that the test statistic indicates a low degree of difference, the determination being based on a comparison with a designated difference threshold, the first data block being a same data block as a second data block that includes the second data unit.

In various embodiments, the data analyzer may be further configured to include the first data unit in a third data block in response to a determination that the test statistic characterizes a data pattern with a high degree of difference, the determination being based on a comparison with a designated difference threshold, the third data block being a different data block than the second data block that includes the second data unit. In some embodiments, the test statistic characterizes a data pattern that is represented by a degree of difference between a first cumulative distribution function associated with the first data unit and a second cumulative distribution function of associated with the second data unit. According to some embodiments, the test statistic characterizes a data pattern with a maximum difference between the first cumulative distribution function associated with the first data unit and a second cumulative distribution function of associated with the second data unit. In some embodiments, the data analyzer is further configured to determine a sampling depth associated with the received plurality of data values, where the sampling depth identifies a size of each data unit of the plurality of data units.

In various embodiments, the sampling depth is determined based on a probability that the first data unit has a low degree of difference with the second data unit. Furthermore, the data analyzer may be further configured to determine a plurality of representative data values associated with the plurality of data units, where each representative data value of the plurality of representative data values characterizes contents of a data unit of the plurality of data units. In some embodiments, each representative data value of the plurality of representative data values is determined based on one of random sampling or determining a mean and variance for an associated data unit. In various embodiments, the plurality of data values is included in streaming data received from network traffic. In some embodiments, the input port and the data analyzer are included in a network device.

Also disclosed herein are systems that may include a network device configured receive a plurality of data values, where the plurality of data values includes a plurality of data units, and wherein the plurality of data values are received as streamed data. The systems may further include a data analyzer configured to determine a test statistic based on at least some of the plurality of data units, the test statistic characterizing a data pattern that is represented by a degree of difference between a first data unit of the plurality of data units and at least a second data unit of the plurality of data units, the second data unit being received before the first data unit. The data analyzer may be further configured to include the first data unit in a first data block in response to a determination that the test statistic indicates a data pattern with a low degree of difference, the determination being based on a comparison with a designated difference threshold, the first data block being a same data block as a second data block that includes the second data unit.

In some embodiments, the data analyzer is further configured to include the first data unit in a third data block in response to a determination that the test statistic characterizes a data pattern with a high degree of difference, the determination being based on a comparison with a designated difference threshold, the third data block being a different data block than the second data block that includes the second data unit. The test statistic may characterize a data pattern that is represented by a degree of difference between a first cumulative distribution function associated with the first data unit and a second cumulative distribution function of associated with the second data unit. In some embodiments, the data analyzer may be further configured to determine a sampling depth associated with the received plurality of data values, where the sampling depth identifies a size of each data unit of the plurality of data units, and where the sampling depth is determined based on a data pattern that is represented by s probability that the first data unit has a low degree of difference with the second data unit. In some embodiments, the data analyzer is further configured to determine a plurality of representative data values associated with the plurality of data units, where each representative data value of the plurality of representative data values characterizes contents of a data unit of the plurality of data units. In various embodiments, each representative data value of the plurality of representative data values is determined based on one of random sampling or determining a mean and variance for an associated data unit.

Also disclosed herein are methods that may include receiving a plurality of data values, where the plurality of data values includes a plurality of data units arranged as a plurality of data blocks. The methods may further include determining, using a data analyzer, a test statistic based on at least some of the plurality of data units, the test statistic characterizing a data pattern that is represented by a degree of difference between a first data unit of the plurality of data units and at least a second data unit of the plurality of data units, the second data unit being received before the first data unit. The methods may also include including, using the data analyzer, the first data unit in a first data block in response to determining that the test statistic indicates a data pattern with a low degree of difference, the determining being based on a comparison with a designated difference threshold, the first data block being a same data block as a second data block that includes the second data unit.

In various embodiments, the methods may also include including the first data unit in a third data block in response to determining that the test statistic characterizes a data pattern with a high degree of difference, the determining being based on a comparison with a designated difference threshold, the third data block being a different data block than the second data block that includes the second data unit. The test statistic may characterize a data pattern that is represented by a degree of difference between a first cumulative distribution function associated with the first data unit and a second cumulative distribution function of associated with the second data unit. The methods may further include determining a sampling depth associated with the received plurality of data values, where the sampling depth identifies a size of each data unit of the plurality of data units, and where the determining of the sampling depth is based on a data pattern that is represented by a probability that the first data unit has a low degree of difference with the second data unit.

Details of one or more embodiments of the subject matter described in this specification are set forth in the accompanying drawings and the description below. Other features, aspects, and advantages will become apparent from the description, the drawings, and the claims.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As similarly discussed above, conventional data analysis techniques for high frequency streaming data remain limited because they are not able to efficiently and effectively analyze large amounts of streaming data. For example, conventional network monitoring techniques may include storing random samples of the streaming data, such as one out of every 1,000 network packets. However, such sampling methods are static and employ linear sampling techniques. Accordingly, such sampling methods are not scalable for high-frequency streaming data, and provide no assurance that the sampled data accurately reflects the underlying data distribution because the sampling may be too random and sparse. Other conventional techniques may utilize exact or approximate data compression techniques, such as spectral analysis. However, such data compression methods require using either the whole data or data chunks in a designated size. Accordingly, such methods are not suitable or practical in the context of analyzing large streaming data at a high frequency which may be transmitted over a communications network.

Various systems, methods, and devices are disclosed herein that provide data pattern detection and dynamic data reduction that may be implemented effectively and efficiently in large streaming data contexts. As disclosed herein, redundant data patterns may be detected in large streaming data sets. The size of the streaming data may be reduced by identifying and utilizing an exchangeability of measurements taken from the streaming data. Accordingly, the amount of data that is stored and used for a subsequent analysis of network traffic may be reduced by analyzing redundancies of within the data included in a time series, as well as analyzing redundancies of data distributions of units of data. As described herein, units of data or data units may describe segments of data in received streaming data having a size that is dynamically configurable and may initially be set to a default size. For example, a data unit may include a series of measurements, such as N measurements. In some embodiments, when data distributions of data units are similar and there is a large probability that a subsequently received data unit will be similar, fewer data records may be stored because the subsequent data units received in the streaming data may be similar to previous data units which have already been received. Moreover, when data distributions of data units are not similar and there is a small probability that a subsequently received data unit will be similar, more data records may be stored because the subsequent data units received in the streaming data are not likely to be similar to previous data units which have already been received. In this way, the amount of data stored when sampling large streaming data may be dynamically adjusted based on the distribution of the underlying data, and various probabilities of exchangeability within the underlying data.

As previously discussed, conventional techniques which utilize random sampling are not able to guarantee that the sampled data accurately reflects the underlying data distribution. Similarly, conventional data compression techniques require either the whole data or data chunks in a designated size, and these methods are not practical for large streaming data at a high frequency. Dynamic data pattern detection and data reduction techniques as disclosed herein reduce the size of stored data records at an exponential scale, while still providing an accurate representation of the underlying data distribution, which may be the streaming data that was originally received. Furthermore, while various embodiments disclosed herein are discussed in the context of streaming data that may have a relatively high frequency, embodiments as disclosed herein may be applied to stored data as well.

Figure 1:
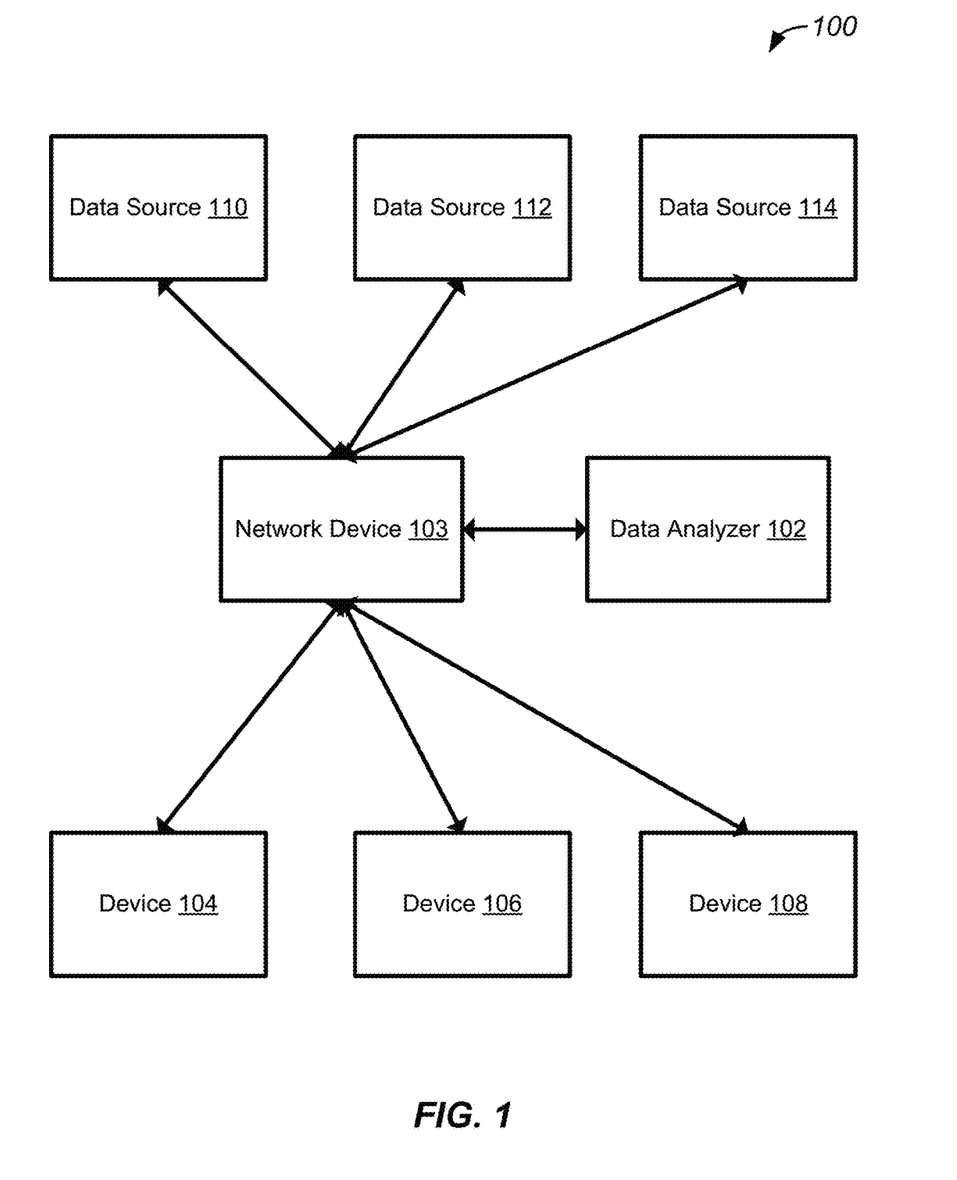
FIG. 1 illustrates an example of a system for data pattern detection and data reduction, implemented in accordance with some embodiments.

FIG. 1 illustrates an example of a system for data pattern detection and data reduction, implemented in accordance with some embodiments. As discussed above, large amounts of streaming data may be generated during the course of operation of a communications network. Accordingly, one or more entities may be coupled to the communications network and may generate the data that is sent over the communications network. Other entities may provide the framework or infrastructure through which the network traffic is transmitted. In various embodiments, a network device and data analyzer may be coupled to the communications network and may receive data from such entities. As discussed in greater detail below, a data analyzer, such as data analyzer 102 may process the received data to reduce the amount of data that may be used in a subsequent analysis or study of the network traffic.

Accordingly, system 100 may include several data sources, such as data source 110, data source 112, and data source 114. In various embodiments, the data sources may be various online entities that may be coupled to a communications network such as the Internet. In some embodiments, the online entities may be providers of online data services which may include the sending, receiving, and streaming of large amounts of data. For example, the data sources may include service providers for video and audio on demand services, providers of cloud computing or backup services, or providers of web hosting services. In various embodiments, an online entity may include any suitable entity capable of transmitting data via a communications network. For example, data sources may include infrastructure entities, such as energy providers and transportation departments, transmitting data from various transmission points within the infrastructure. Moreover, system 100 may include various devices which may be particular communications devices. For example, a device, such as device 104, device 106, and device 108, may be a device capable of communications via the communications network, such as a smartphone, laptop, personal computer (PC), tablet PC, or global positioning system receiver.

In various embodiments the data sources and devices may send and receive data via a network device, such as network device 103. In some embodiments, network device 103 may be configured to handle the routing and/or forwarding of data to and from various locations. In some embodiments, network device 103 may be a network switch that may be configured, among other things, to forward data via packet switching to one or more data sources and/or devices. In various embodiments, network device 103 may be a router, repeater, network node, bridge, or server.

In various embodiments, system 100 may further include data analyzer 102 which may be configured to implement one or more data reduction methods as discussed herein. Accordingly, data analyzer 102 may be configured to process received data that may be streamed, analyze patterns in the received data, and dynamically adjust sampling rates associated with the streamed data based on such an analysis, as discussed in greater detail below with reference to FIG. 3 and FIG. 4. In some embodiments, data analyzer 102 may be implemented as a system component separate from network device 103. For example, data analyzer 102 may be implemented in a separate device, which may be a device as discussed in greater detail below with reference to FIG. 2, or a separate data processing system, such as a data processing system as discussed in greater detail below with reference to FIG. 7. Accordingly, data analyzer 102 may be a separate component from network device 103 and may be configured to receive data in parallel with network device 103. In various embodiments, data analyzer 102 may be implemented within network device 103. Accordingly, data analyzer 102 may be implemented as hardware and/or software that is included within network device 103.

Figure 2:
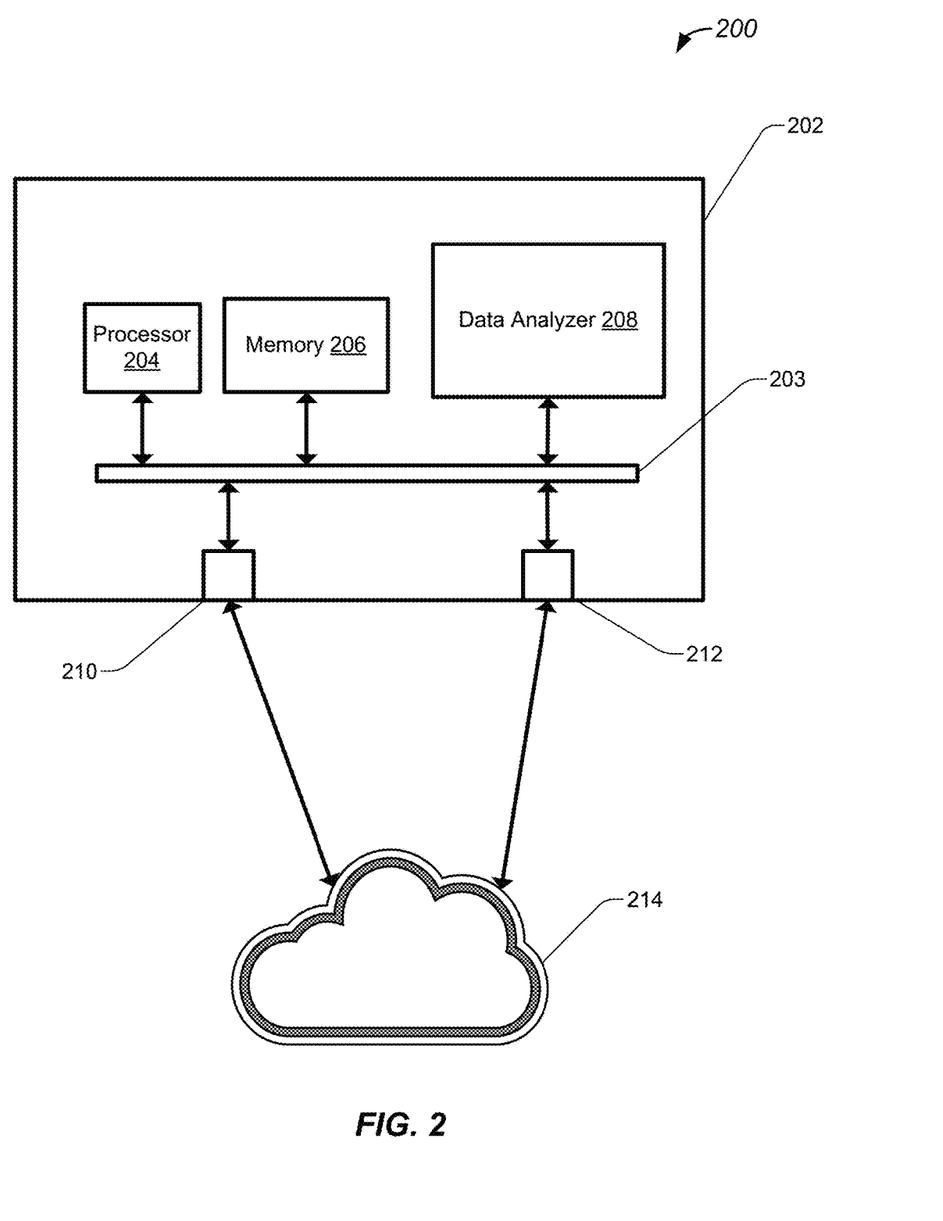
FIG. 2 illustrates an example of a device for data pattern detection and data reduction, implemented in accordance with some embodiments.

FIG. 2 illustrates an example of a device for data pattern detection and data reduction, implemented in accordance with some embodiments. In various embodiments, a device, such as device 200, may be implemented as a standalone device or may be implemented as a network device. In various embodiments, device 200 may be communicatively coupled to a communications network, such as network 214, and may send and receive data via the communications network. Thus, device 200 may be configured to handle network traffic on a communications network as well as implement one or more data reduction methods as disclosed herein and described in greater detail below with reference to FIG. 3 and FIG. 4.

Accordingly, device 200 may include housing 202 which may be made of a rigid material configured to support various other components of device 200. For example, housing 202 may include various communications ports and/or interfaces. In some embodiments, such communications ports and/or interfaces may include input port 210 and output port 212 which may be configured to be communicatively coupled to network 214 and may be configured to receive and transmit data to and from network 214. For example, input port 210 and output port 212 may each be Ethernet ports, USB ports, DSL interfaces, cable interfaces, or any other suitable communications port or interface. Furthermore, device 200 may include communications bus 203 which may be configured to communicatively couple internal components of device 200. In some embodiments, communications bus 203 may be a PCI bus or other communications fabric. For example, input port 210 and output port 212 may be coupled to communications bus 203 and may be configured to send and receive data to internal components of device 200 via communications bus 203.

In various embodiments, device 200 may further include processor 204 and memory 206 which may also be coupled to communications bus 203. In various embodiments, processor 204 and memory 206 may be configured to execute one or more instructions to perform one or more network operations. For example, processor 204 may manage the handling or transfer of data along communications bus 203, and one or more instructions configuring the operation of processor 204 may be stored in memory 206. Accordingly, processor 204 and memory 206 may be configured to implement one or more network communications operations thus enabling device 200 to handle the forwarding and transmission of network traffic.

Device 200 may further include data analyzer 208 which may include one or more processing devices configured to analyze network data and implement one or more data reduction methods. Thus, data analyzer 208 may be configured to determine sampling rates, determine test statistics, and store sampled data, as will be discussed in greater detail below with reference to FIG. 3 and FIG. 4. In various embodiments, data analyzer 208 may also be coupled to communications bus 203. Accordingly, data analyzer 208 may be configured to communicate with other internal components of device 200. Moreover, data analyzer 208 may be configured to independently communicate with input port 210 and output port 212. Accordingly, data analyzer 208 may implement data reduction methodologies independent of processor 204 and memory 206.

Furthermore, as similarly stated above, data analyzer 208 may include one or more processing devices specifically configured to process streaming data received from various online entities and/or devices. In one example, data analyzer 208 may include a plurality of processing nodes configured to processing large amounts of streaming data received from high frequency streaming sources which transmit large amounts of data over network 214. For example, data analyzer 208 may include several processing nodes configured to handle processing operations on large data sets. In one specific embodiment, data analyzer 208 may include one or more application specific processors implemented in application specific integrated circuits (ASICs) that may be specifically configured to process large amounts of data in complex data sets, as may be found in the context streamed data from online service providers.

In some embodiments, the one or more processors may be implemented in one or more reprogrammable logic devices, such as a field-programmable gate array (FPGAs), which may also be similarly configured. According to various embodiments, data analyzer 208 may include a dedicated processing unit that includes one or more hardware accelerators configured to perform test statistic operations and adjustments that may occur dynamically. For example, as discussed in greater detail below, operations associated with the determination of test statistics as well as the adjustment of sampling depths may be processed, at least in part, by one or more hardware accelerators included in data analyzer 208.

Figure 3:
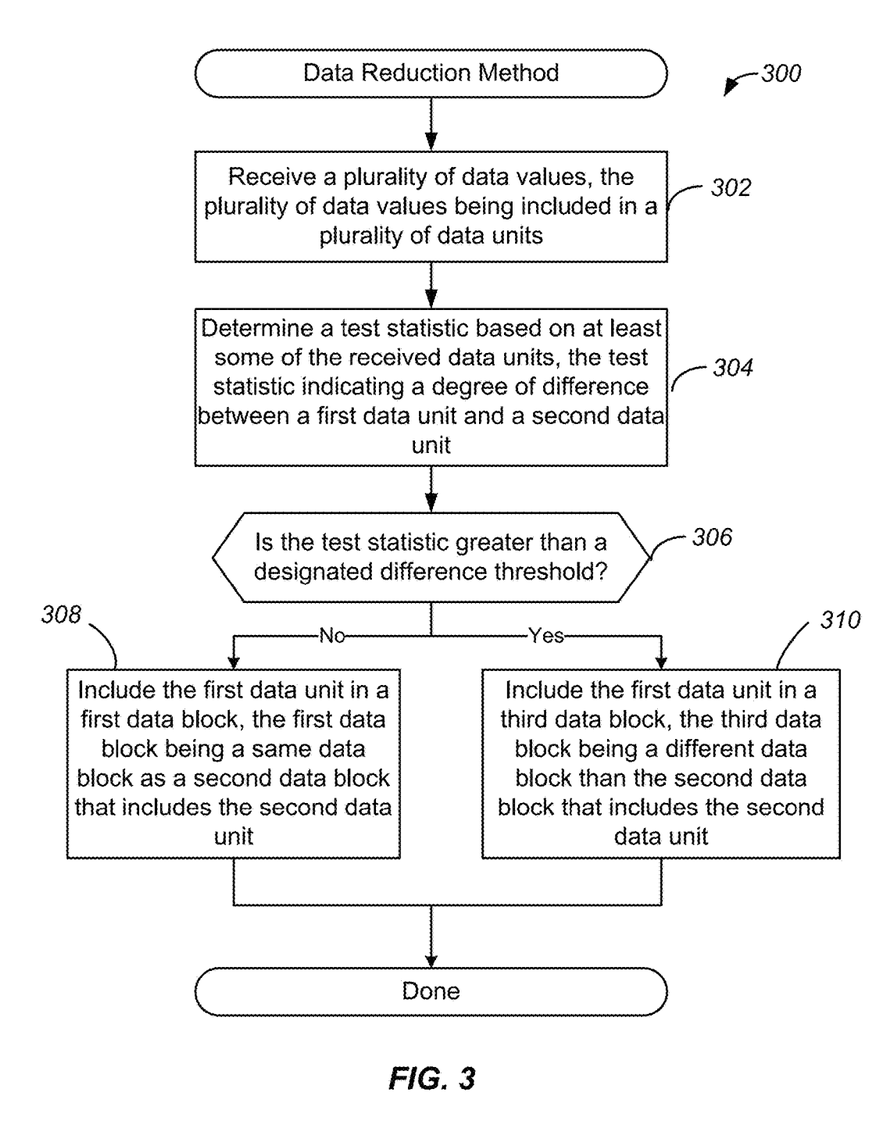
FIG. 3 illustrates a flow chart of an example of a data pattern detection and data reduction method, implemented in accordance with some embodiments.

FIG. 3 illustrates a flow chart of an example of a data pattern detection and data reduction method, implemented in accordance with some embodiments. In various embodiments, method 300 may provide dynamic data pattern detection and data reduction in large streaming data contexts. As similarly discussed above, data patterns may be detected in large streaming data sets, and the size of data stored based on the received streaming data may be reduced by identifying and utilizing a data pattern which is represented by a similarity or exchangeability of a measurement relative to previous measurements taken from the streaming data. In some embodiments, when data distributions of data units are similar and there is a large probability that a subsequently received data unit will be similar, fewer data samples may be taken because the subsequent data units received in the streaming data may be similar to previous data units which have already been received. Moreover, when data distributions of data units are not similar and there is a small probability that a subsequently received data unit will be similar, more data samples may be taken because the subsequent data units received in the streaming data are not likely to be similar to previous data units which have already been received. In this way, the number of samples taken and the amount of data stored when sampling large streaming data may be dynamically adjusted based on the distribution of the underlying data, and various data patterns that are represented by probabilities of exchangeability within the underlying data.

Accordingly, method 300 may commence with operation 302 during which several data values may be received. As similarly discussed above with reference to FIG. 1 and FIG. 2, the data may be received as streaming data. Accordingly, a data source, which may be an online entity, may generate the streaming data, and the data may be received at a system component, such as a network device and/or a data analyzer. As will be discussed in greater detail below with reference to FIG. 4, the received data may be organized or arranged into data units and data blocks by a system component, such as the data analyzer. Accordingly, the streaming data, which may include data packets and other data structures, may be arranged into data units for the purposes of analysis by the data analyzer.

Method 300 may proceed to operation 304 during which a test statistic may be determined based on at least some of the received data units. In some embodiments, the test statistic may indicate a degree of similarity or difference between a first data unit and a second data unit. Accordingly, the test statistic may characterize data patterns that are represented by how similar or different a particular data unit, such as a data unit that has been received and is being currently analyzed, may be to previously received data units. As will be discussed in greater detail below with reference to FIG. 4, such a test statistic may be determined based on a comparison of their respective underlying data distributions. Moreover, the contents of the first data unit may be sampled for the purposes of analysis at a sampling depth that is determined or configured based on patterns in the data that was previously received.

Method 300 may proceed to operation 306 during which it may be determined whether or not the determined test statistic is greater than a designated difference threshold. Accordingly, a system component, such as a data analyzer, may be configured to generate a test statistic that may characterize a data pattern that is represented by a degree of difference or similarity between a first data unit and a second data unit. In some embodiments, the first data unit may correspond to one or more data values that were just received and are currently being analyzed. As will be discussed in greater detail below with reference to FIG. 4, the first data unit may be compared with other previously received data units to determine the test statistic. For example, the first data unit may be compared with a second data unit, where the second data unit includes data that was received immediately prior to the first data unit.

If it is determined that the test statistic is less than the designated difference threshold, method 300 may proceed to operation 308 during which the first data unit may be included in a first data block. As described herein, data blocks may be aggregations or collections of data units defined by a number of sequential data units. For example, several data units each having N measurements may be included in a data block. Moreover, as will be discussed in greater detail below, the size or a number of data units included in a data block maybe determined based on data patterns in the received streaming data. Thus, the size of a data block may be dynamically configured in response to changes in the patterns of received streaming data. In some embodiments, the first data block may be the same data block as a second data block which may have been previously used to store the second data unit. Thus, the first data unit may be stored in the same data block as one or more previously received data units, such as the second data unit, in response to determining that the test statistic is less than the designated difference threshold. Accordingly, when the first data unit is stored in the same data block as an immediately preceding data unit, it has been determined that the first data unit and at least the second data unit are part of the same data distribution that underlies that data block. Accordingly, the first data unit may be included in the data block, and may subsequently be included in a cumulative distribution function that may be used in subsequent determinations of test statistics that may involve the data block, as discussed in greater detail below. Furthermore, the first data unit may be stored at a sampling depth that is determined based, at least in part, on one or more preceding data units.

Returning to operation 306, if it is determined that the test statistic is greater than the designated difference threshold, method 300 may proceed to operation 310 during which the first data unit may be included in a third data block. In some embodiments, the third data block may be a different data block than the second data block which may have been previously used to store the second data unit. Thus, the first data unit may be stored in a different data block as one or more previously received data units, such as the second data unit, in response to determining that the test statistic is greater than the designated difference threshold. Therefore, as similarly discussed above, the first data unit may be stored in a different data block as an immediately preceding data unit, and may be stored at a sampling depth that is determined based, at least in part, on one or more preceding data units. Accordingly, when the first data unit is stored in a different data block as an immediately preceding data unit, it has been determined that the first data unit and at least the second data unit are part of different data distributions. Accordingly, the first data unit may be included in a different data block from the second data unit, and subsequent determinations of test statistics might not involve the second data unit or its associated data block, as discussed in greater detail below.

Figure 4:
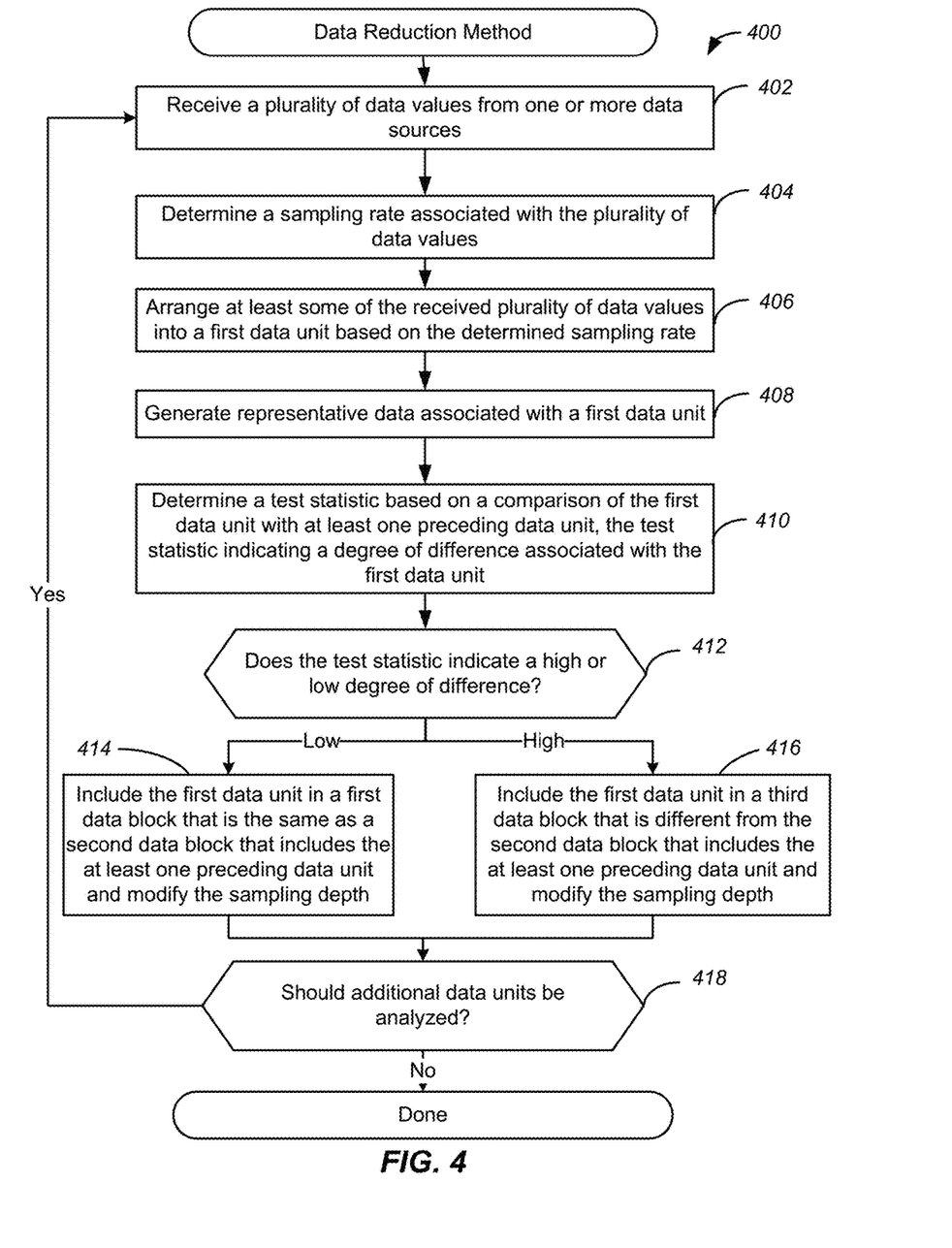
FIG. 4 illustrates a flow chart of an example of another data pattern detection and data reduction method, implemented in accordance with some embodiments.

FIG. 4 illustrates a flow chart of an example of another data pattern detection and data reduction method, implemented in accordance with some embodiments. As similarly discussed above, method 400 may provide dynamic data pattern detection and data reduction in large streaming data contexts. Therefore, according to some embodiments, method 400 may be implemented to dynamically adjust sampling rates associated with received data based on patterns within the data, thus reducing an amount of data that may ultimately be generated for subsequent network analysis.

Accordingly, method 400 may commence with operation 402 during which a plurality of data values may be received. As similarly discussed above with reference to FIG. 1, FIG. 2, and FIG. 3, the data may be received as streaming data. Thus, one or more data sources which may be communicatively coupled to a communications network may provide streaming data over the communications network. Such data may include data packets or any suitable data structure capable of being transmitted over a communications network. The data may be routed through or handled by a network device, such as a switch. As similarly discussed above, the network device may be configured to monitor the traffic and generate traffic logs describing or characterizing network activity handled by that particular network device. In some embodiments, the streaming data may be received at a component, such as a data analyzer. As discussed above, the data analyzer may be implemented within the network device, or may be implemented separately as a separate data processing system.

Method 400 may proceed to operation 404 during which a sampling rate may be determined. As will be discussed in greater detail below with reference to FIG. 6, a sampling rate may be a rate at which measurements are acquired from the received streaming data. In some embodiments, the sampling rate may be determined based, at least in part, on a sampling level or depth within a sampling depth hierarchy, as discussed in greater detail below with reference to FIG. 6. Thus, according to some embodiments, a designated hierarchy of sampling rates may exist in which different levels or depths correspond to different sampling rates. In some embodiments, each sampling depth may define a size of a data unit that the streaming data is partitioned into, and each data unit may be sampled one or more times.

For example, within a sampling hierarchy, a depth of zero may correspond to a relatively high sampling rate in which a data unit is defined to be relatively small. In this example, the data unit may be one bit wide. Because every data unit is sampled, every bit received in the streaming data associated with the data unit being analyzed may be sampled. Moreover, the same sampling hierarchy may include additional depths having different data unit sizes. For example, the sampling hierarchy may have additional sampling depths of one, two, and three. In some embodiments, for each additional depth, the size of the data unit may be doubled or exponentially increased. Thus, a depth of one may have a data unit two bits wide, a depth of two may have a data unit four bits wide, and a depth of three may have a data unit eight bits wide. Accordingly, by adjusting or modifying the size of the data unit, the effective sampling rate of the received streaming data may be adjusted or modified as well. As will be discussed in greater detail below, a number of samples taken from each data unit may also be modified, thus providing additional configurability of the sampling rate. It will be appreciated that while one example of a sampling depth hierarchy has been described, any suitable hierarchy or scheme may be used to implement a sampling rate. Moreover, the size of a data unit may be larger than the previously discussed examples. For example, a data unit implemented by a depth or level within a sampling hierarchy may be tens, hundreds, or thousands of bits wide.

In various embodiments, the sampling rate may be determined based on one or more previously received data values. In various embodiments, as data has been streamed and received by the data analyzer, it may be partitioned into data units. Accordingly, previously received data units may have been previously partitioned into data units and stored in one or more records, as may have occurred during previous iterations of a data reduction method such as method 400. In some embodiments, a component, such as the data analyzer, may be configured to analyze at least some of the previous data units to determine a sampling rate or depth to be applied to the current data unit being analyzed. As will be discussed in greater detail below, test statistics indicative of data patterns that are represented by similarities or differences among data units may be generated for data units during different iterations of method 400 as data is streamed and received. Accordingly, test statistics associated with previously received data units may have been previously calculated and stored by a system component, such as the data analyzer.

In some embodiments, a probability may be determined based on test statistics associated with previously received data units. Thus, given determinations of similarities/differences for the previously received data units, a probability may be determined that identifies the probability that the data unit currently being analyzed is similar to the immediately preceding data unit. In some embodiments, additive Markov chains may be used to calculate or determine such a probability. According to various embodiments, an additive Markov chain may be a Markov chain that has an additive conditional probability function. Thus, a transition probability to a state at a next moment in time may be a sum of functions, each depending on the next state and one or more of the previous states. Accordingly, the probability that a data unit has a particular test statistic value depends on the values of previous test statistics associated with previous data units. Such an additive Markov chain may be generated based on the equation 1 shown below:

$$p(I_{EX(*,t)} \mid I_{EX(1,t-1)}) \propto \sum_{i=1,\ldots,t-1} I_{EX(i,t)} \cdot \exp\left(-\frac{t-i}{\sigma^2}\right)$$

$$\text{s.t. } I_{EX(i,t)} \wedge I_{EX(i,j)} \rightarrow I_{EX(j,t)}$$

In equation 1 shown above, $I_{EX(i,j)}$ may be an indicator function that may return a value of "1" when the i-th data unit and the j-th data unit are determined to be similar or exchangeable. The indicator function may return a value of "0" otherwise. Moreover, $I_{EX(*,t)}$ may denote another indicator function that represents whether the t-th data unit is similar to or exchangeable with any data unit having an index value between 1 and t−1. If all previous data units within a time period of interest have test statistics indicating they are similar and exchangeable, then the probability may be determined by equation 2 shown below:

$$p(I_{EX(t,t-1)} = 1 \mid I_{EX(t-1,t-2)} = 1, \ldots, I_{EX(2,1)} = 1) \propto \sum_{i=1,\ldots,t-1} \exp\left(-\frac{t-i}{\sigma^2}\right)$$

In some embodiments, a mapping scheme may be implemented to map or correlate the calculated probability with corresponding sampling depths in a sampling hierarchy. For example, a relatively high probability, such as 0.9, may be mapped to a high sampling depth which results in a larger data unit size and lower effective sampling rate. Similarly, a relatively low probability, such as 0.1, may be mapped to a low sampling depth which results in a smaller data unit size and higher effective sampling rate.

In some embodiments, one or more system components, such as a data analyzer, may be configured to store one or more data values in a data record that identify previously calculated probabilities that may be associated with data units. For example, the data analyzer may store and maintain a list that identifies calculated probabilities $p(I_{EX(t,t-1)})$, as may be calculated based on the formulas described above, for previous data units that were received an analyzed prior to the data unit currently being analyzed.

Method 400 may proceed to operation 406 during which at least some of the received plurality of data values may be arranged into a first data unit based on the determined sampling rate. As similarly discussed above, the received data may be organized or arranged into data units and data blocks by a system component, such as the data analyzer, and the organization or arrangement of such data may be performed based on the determined sampling depth. Accordingly, a system component, such as a data analyzer, may collect a number of data values as they are streamed in. The number of data values may be determined based on the width of the data unit specified by the sampling depth that has been previously determined during operation 404.

Method 400 may proceed to operation 408 during which one or more representative data values associated with the first data unit may be generated. In some embodiments, the representative data values may be generated by processing the data values included in the first data unit. For example, a mean and variance may be calculated based on all data values included in the first data unit. In various embodiments, the one or more representative data values may be generated by randomly sampling the contents of the first data unit. The sampling rate for such sampling may be determined based upon a sampling scheme or hierarchy. As discussed in greater detail below, according to some embodiments, a sampling depth within a hierarchy may increase when consecutive data units show similar data patterns. Accordingly, at higher sampling depths, exponentially fewer samples may be taken. For example, a sampling rate may be determined by a formula such as $N/2^{Depth}$. In this example, "Depth" may be an integer identifying a sampling depth within a sampling hierarchy, as discussed in greater detail below with reference to FIG. 6, and N may refer to a number of data values, which may be data bits, measures, or packages, included in the data unit. In one example, a data unit including N measurements or data values may be sampled at a depth of 1 and may have a sampling rate or pattern in which N/2 random samples are taken. In another example, a data unit including N measurements may be sampled at a depth of 3 and may have a sampling rate or pattern in which N/8 random samples are taken. Accordingly, the one or more representative data values may be obtained from the first data unit and retained for subsequent analysis.

Method 400 may proceed to operation 410 during which a test statistic may be determined based on a comparison of the first data unit with at least one preceding data unit. In some embodiments, the test statistic may characterize a data pattern that is represented by a degree of difference associated with the first data unit. Thus, the first data unit may be compared with a second data unit, where the second data unit immediately preceded the first data unit and was received immediately before the first data unit in a sequence of data units included in the plurality of data values.

In various embodiments, distributions of data values within the first and second data units may be compared to determine or characterize data patterns that are represented by or indicative of whether or not they are similar or different. For example an empirical cumulative density function (ecdf) may have been generated for each of the first and second data units by a component, such as the data analyzer, based on the representative data values that were sampled from each data unit respectively. In some embodiments, the ecdf may be determined based on the data unit being currently analyzed and all previous data units that were previously determined to be similar or exchangeable. For example, the ecdf of the first data unit may be compared against the collective ecdf of all data units in the current data block. In this way, the data distribution of the first data unit may be compared against the data distribution of a pattern in the data that preceded the first data unit. Accordingly, a relationship between a first distribution of the first data unit and a second distribution of at least the second data unit may be analyzed to generate a test statistic indicative of a degree of similarity of difference between the two data units.

In some embodiments, a Kolmogorov-Smirnov (KS) test may be implemented to generate the test statistic. In some embodiments, the KS test may be a nonparametric test of the equality of two different probability distributions. Thus, a test statistic generated by the KS test may quantify a data pattern having a distance between the first distribution of the first data unit and the second distribution of the second data unit. Accordingly, the KS test may generate a score that quantifies the largest gap between the two distributions. In some embodiments, the test statistic may include the score generated by the KS test. In this way, the test statistic may characterize a data pattern that is represented by a degree of similarity or difference between the first distribution of the first data unit and the second distribution of the second data unit. In various embodiments, the KS test may be implemented using an equation similar to equation 3 shown below:

$$\mathcal{KS}(X', X^t) = \max_l (|F_{X'}(l) - F_{X_t}(l)|)$$

$$\text{Where: } F_X(l) = \frac{1}{N} \sum_{\substack{x_i \in X \\ 1 \leq i \leq |X|}} \text{s.t. } 1\{x_i \leq l\}$$

While various embodiments herein describe the implementation of a Kolmogorov-Smirnov (KS) test, other statistical tests may be used as well. For example, various embodiments as disclosed herein may implement an Anderson-Darling test to generate the test statistic. According to some embodiments, a Chi-squared test may be implemented to generate the test statistic.

Method 400 may proceed to operation 412 during which it may be determined whether or not the test statistic indicates a high or low degree of difference. In various embodiments, a component, such as the data analyzer, may compare the test statistic with a threshold difference value to determine the degree of difference indicated by the test statistic. For example, a KS test may generate a score that indicates that two data units are generated from the same distribution. Accordingly, when a KS score is greater than $c(\alpha)$, a probability indicating that the two data units are different may be determined based on the value of $1-\alpha$. In some embodiments, $\alpha$ may be set to a value that is relatively small, such as about 0.01. If it is determined that the test statistic indicates a low degree of difference, method 400 may proceed to operation 414.

Accordingly, at operation 414, the first data unit may be included in a first data block. In some embodiments, the first data block is the same data block as a second data block that includes the at least one preceding data unit. Thus, the first data unit may be stored in the same data block as one or more previously received data units, such as the second data unit, in response to determining that the test statistic is less than the designated difference threshold. As similarly discussed above with reference to FIG. 3, when the first data unit is stored in the same data block as an immediately preceding data unit, such as the second data unit, it has been determined that the first data unit and at least the second data unit are part of the same data distribution that underlies that data block. Accordingly, the first data unit may be included in the data block, and may subsequently be included in a cumulative distribution function that may be used in subsequent determinations of test statistics that may involve the data block. For example, in a subsequent iteration of method 400, an additional data unit may be received as streaming data and may be compared with the first data unit. In this example, the distribution of the additional data unit may be compared with the distribution of the entire data block that now includes the first data unit. Furthermore, in response to determining that the test statistic is less than the designated difference threshold, the sampling depth may be adjusted to a higher depth, and fewer samples may be collected. In some embodiments, additional sampling may optionally be performed to reduce data loss.

Returning to operation 412, if it is determined that the test statistic indicates a high degree of difference, method 400 may proceed to operation 416 during which the first data unit may be included in a third data block. In some embodiments, the third data block may be a different data block than the second data block that includes the at least one preceding data unit. Thus, the first data unit may be stored in a different data block as one or more previously received data units, such as the second data unit, in response to determining that the test statistic is greater than the designated difference threshold. As similarly discussed above, when the first data unit is stored in a different data block as an immediately preceding data unit, such as the second data unit, it has been determined that the first data unit and at least the second data unit are part of different data distributions. Accordingly, the first data unit may be included in a different data block from the second data unit, and subsequent determinations of test statistics might not involve the second data unit or its associated data block. Similar to a previous example, in a subsequent iteration of method 400, an additional data unit may be received as streaming data and may be compared with the first data unit. In this example, the distribution of the additional data unit may be compared with the distribution of the first data unit, but not the distribution of the data block that includes the second data block. Furthermore, in response to determining that the test statistic is greater than the designated difference threshold, the sampling depth may be adjusted to a lower depth, and more samples may be collected.

Method 400 may proceed to operation 418 during which it may be determined whether additional data units should be analyzed. In some embodiments, data values may continuously stream in and additional data values may be received for analysis. Accordingly, if additional data values have been received at a component, such as a data analyzer, method 400 may return to operation 402 and method 400 may repeat. In various embodiments, if no additional data values have been received, method 400 may terminate.

Figure 5:
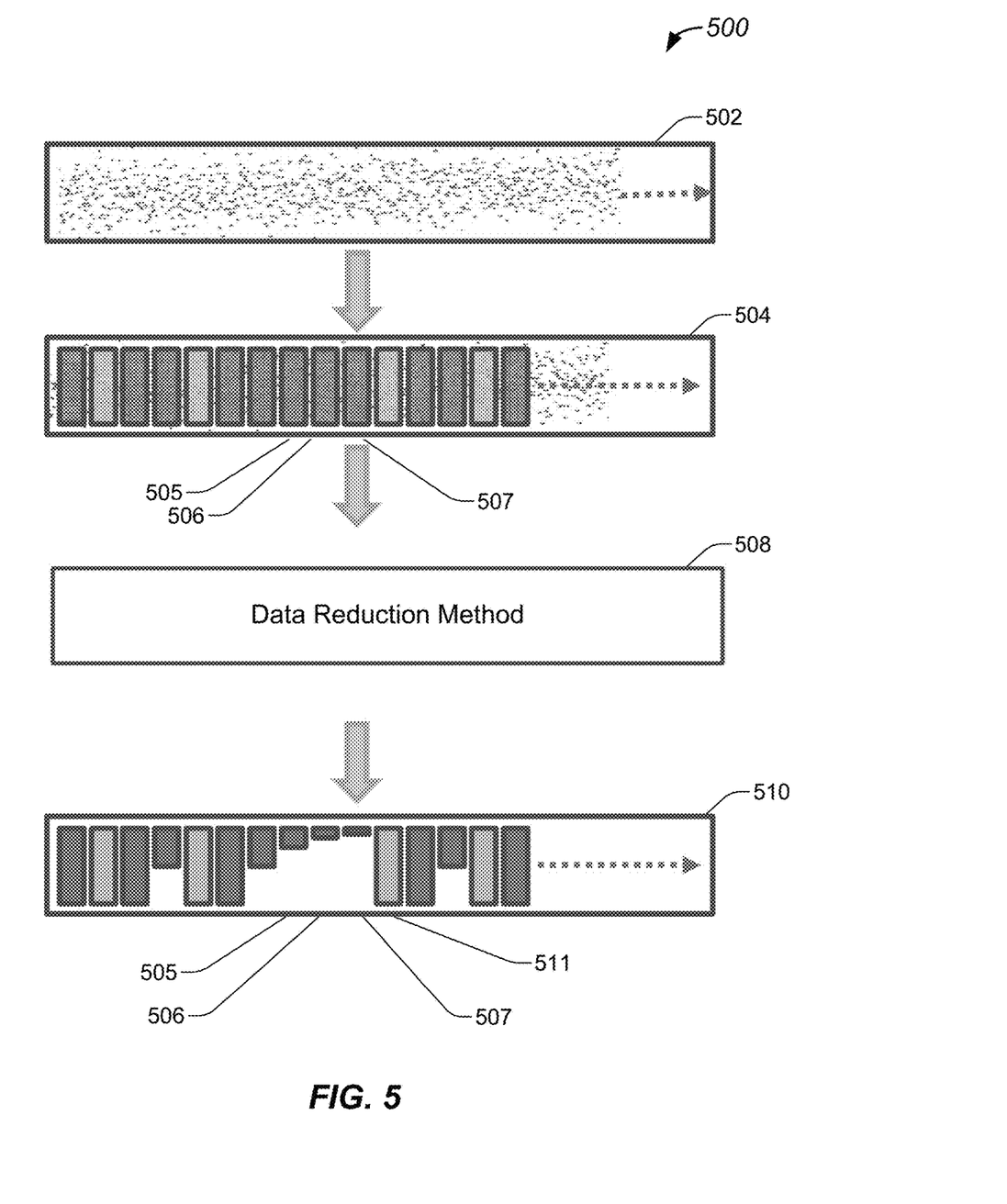
FIG. 5 illustrates an example of a diagram of a set of data values that has been reduced in accordance with some embodiments.

FIG. 5 illustrates an example of a diagram of a set of data values that has been reduced in accordance with some embodiments. Accordingly, diagram 500 may include a graphical representation of data that has been reduced by one or more data reduction methods disclosed herein. For example, portion 502 may be a graphical representation of a distribution of data values included in streaming data that may be received from various data sources, as discussed above. Portion 504 provides a graphical representation of received streaming data that has been arranged or included in several data units, as may be performed by a system component such as a data analyzer. For example, the data units may include data unit 505, data unit 506, and data unit 507. Portion 508 may provide a graphical representation of the application of one or more data reduction methods, as discussed above with reference to FIG. 3 and FIG. 4, to the received streamed data. It will be appreciated the particular location and/or implementation of the data reduction methods shown in portion 508 may be applied at any suitable time during the receiving of the streaming data. Thus, portion 508 simply provides a general graphical representation of the application of data reduction methods, and portion 508 is not intended to be limiting in any way.

In some embodiments, portion 510 provides a graphical representation of the received streaming data that has been reduced by the application of one or more data reduction methods as disclosed herein. As shown by the relative size of the data units within the graphical representation, the amount of data stored by each of data units 505, 506, and 507 has been greatly reduced. In this instance, each of data units 505, 506, and 507 has been stored according to a sampling depth or rate determined based, at least in part, on one or more probabilities derived from detected patterns of data that were received previously. For example, several of the data units that were received before data unit 507 were determined to be similar or exchangeable. Accordingly, data unit 507 was stored at an appropriate sampling depth or rate that acquired relatively few samples and stored a small amount of data relative to the full underlying data set. Portion 510 further illustrates data unit 511 which has been determined to not be similar to previous data units, and accordingly has been stored in a separate data block at an appropriate sampling depth or rate that acquired many samples to retain a relatively large amount of data.

Figure 6:
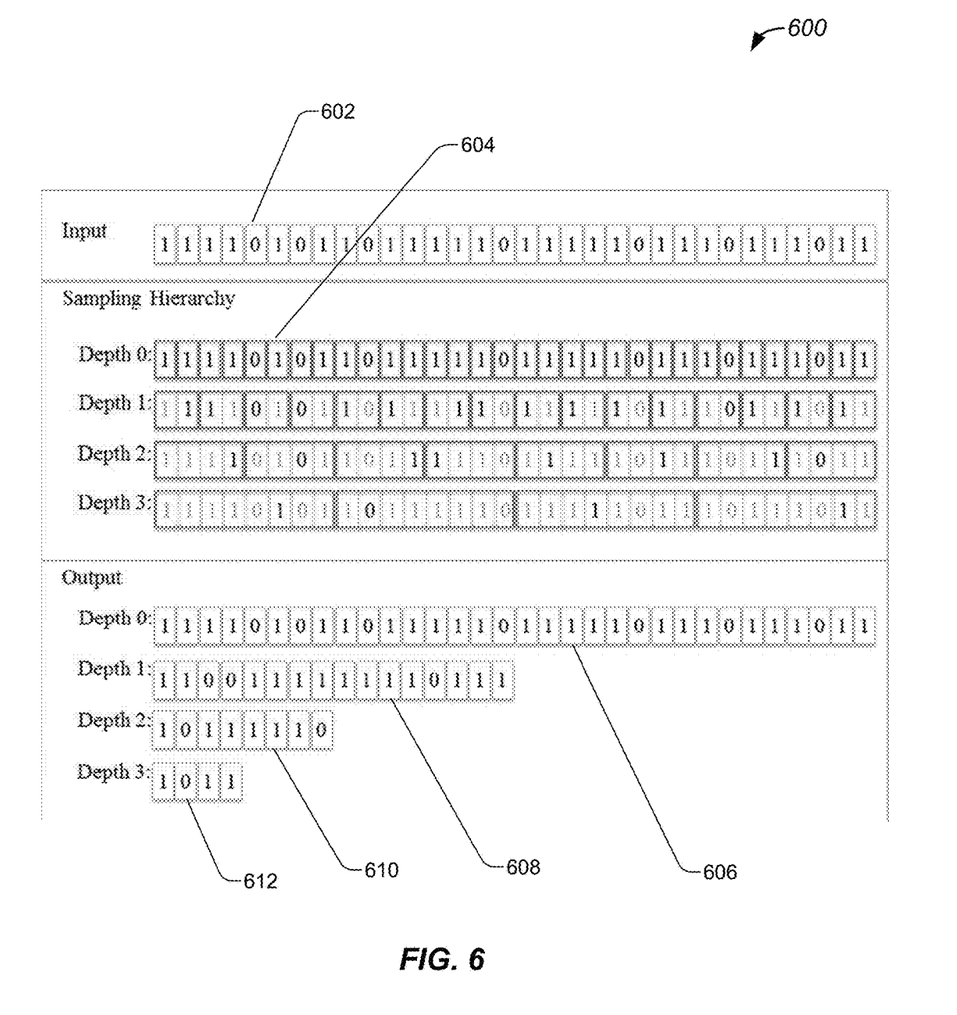
FIG. 6 illustrates an example of a diagram of a sampling depth hierarchy, implemented in accordance with some embodiments.

FIG. 6 illustrates an example of a diagram of a sampling depth hierarchy, implemented in accordance with some embodiments. As shown in diagram 600, a set of data values may be received as an input, such as input 616. As similarly discussed above, the input data may be streaming data received from various different data sources. A sampling hierarchy, such as sampling hierarchy 604, may be applied to the received data to generate an output that may be a reduced data set. In this example, sampling hierarchy 604 has four different depths, such as depth 0, 1, 2, and 3. In this example, for each sampling depth, the received data is partitioned into data units of a particular size, and a sample is taken from each data unit. Accordingly, when at a sampling depth of 0, the size of a data unit may be relatively small and an effective sampling rate, which may be indicative of an overall number of samples taken, may be relatively high, as shown by output 606. Furthermore, when at a sampling depth of 3, the size of a data unit may be relatively large and an effective sampling rate may be relatively low, as shown by output 612 which has relatively fewer samples and data values than output 606. It will be appreciated that while sampling hierarchy 604 includes a hierarchy having four depths, any suitable number of depths may be utilized. For example a sampling hierarchy may have fewer depths, such as two depths, or more depths, such as eight depths.

Figure 7:
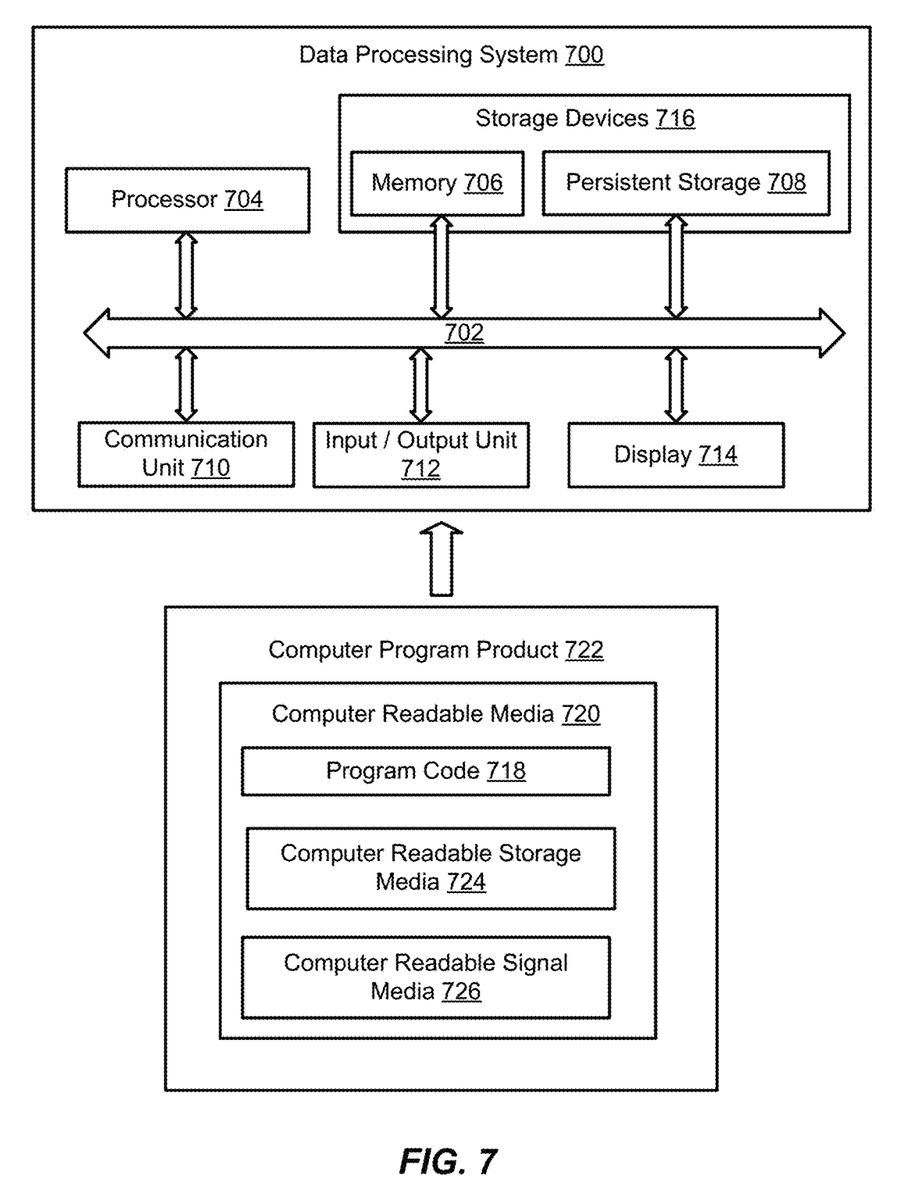
FIG. 7 illustrates a data processing system configured in accordance with some embodiments.

FIG. 7 illustrates a data processing system configured in accordance with some embodiments. Data processing system 700, also referred to herein as a computer system, may be used to implement one or more computers or processing devices used in a controller, server, or other components of systems described above, such as an audience segment analyzer. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, as may be included in a multi-processor core. In various embodiments, processor unit 704 is specifically configured and optimized to process large amounts of data that may be involved when processing streaming data, as discussed above. Thus, processor unit 704 may be an application specific processor that may be implemented as one or more application specific integrated circuits (ASICs) within a processing system. Such specific configuration of processor unit 704 may provide increased efficiency when processing the large amounts of data involved with the previously described systems, devices, and methods. Moreover, in some embodiments, processor unit 704 may be include one or more reprogrammable logic devices, such as field-programmable gate arrays (FPGAs), that may be programmed or specifically configured to optimally perform the previously described processing operations in the context of large and complex data sets.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A device for reducing an amount of memory used to store data records representing network traffic, the device comprising:
    an input port configured to receive a plurality of data values, the input port being a hardware port, wherein the plurality of data values is associated with a plurality of data units;
    a data analyzer comprising a processor configured to:
        determine a test statistic based on at least some of the plurality of data units, the test statistic characterizing a data pattern that is represented by a degree of difference between a first data unit of the plurality of data units and at least a second data unit of the plurality of data units, the second data unit being received at the input port before the first data unit, the test statistic being determined based, at least in part, on a comparison of a first cumulative density function of the first data unit and a second cumulative density function of a second data block, the first data unit being sampled at a sampling depth determined based on a probability the first data unit and the second data unit are part of a same data distribution of streamed data, the probability being determined based, at least in part, on a comparison of the test statistic with previously generated test statistics of previously received data units including the second data unit; and
        include the first data unit in a first data block in response to a determination that the test statistic indicates a low degree of difference, the determination being based on a comparison with a designated difference threshold, the first data block being a same data block as the second data block that includes the second data unit, the including of the first data unit in the first data block further comprising storing the first data unit in a memory at the determined sampling depth.

2. The device of claim 1, wherein the data analyzer is further configured to:
    include the first data unit in a third data block in response to a determination that the test statistic characterizes a data pattern with a high degree of difference, the determination being based on a comparison with a designated difference threshold, the third data block being a different data block than the second data block that includes the second data unit.

3. The device of claim 1, wherein the test statistic characterizes a data pattern that is represented by a degree of difference between a first cumulative distribution function associated with the first data unit and a second cumulative distribution function of associated with the second data unit.

4. The device of claim 3, wherein the test statistic characterizes a data pattern with a maximum difference between the first cumulative distribution function associated with the first data unit and a second cumulative distribution function of associated with the second data unit.

5. The device of claim 1, wherein the data analyzer is further configured to:
    determine the sampling depth associated with the received plurality of data values, wherein the sampling depth identifies a size of each data unit of the plurality of data units.

6. The device of claim 5, wherein the sampling depth is determined based on a probability that the first data unit has a low degree of difference with the second data unit.

7. The device of claim 1, wherein the data analyzer is further configured to:
    determine a plurality of representative data values associated with the plurality of data units, wherein each representative data value of the plurality of representative data values characterizes contents of a data unit of the plurality of data units.

8. The device of claim 7, wherein each representative data value of the plurality of representative data values is determined based on one of random sampling or determining a mean and variance for an associated data unit.

9. The device of claim 1, wherein the plurality of data values is included in streaming data received from network traffic.

10. The device of claim 1, wherein the input port and the data analyzer are included in a network device.

11. A system for reducing an amount of memory used to store data records representing network traffic, the system comprising:
    network device comprising an input port configured receive a plurality of data values, the input port being a hardware port, wherein the plurality of data values is associated with a plurality of data units, and wherein the plurality of data values are received as streamed data;
    a data analyzer comprising a processor configured to:
        determine a test statistic based on at least some of the plurality of data units, the test statistic characterizing a data pattern that is represented by a degree of difference between a first data unit of the plurality of data units and at least a second data unit of the plurality of data units, the second data unit being received before the first data unit, the test statistic being determined based, at least in part, on a comparison of a first cumulative density function of the first data unit and a second cumulative density function of a second data block, the first data unit being sampled at a sampling depth determined based on a probability the first data unit and the second data unit are part of a same data distribution of streamed data, the probability being determined based, at least in part, on a comparison of the test statistic with previously generated test statistics of previously received data units including the second data unit; and include the first data unit in a first data block in response to a determination that the test statistic indicates a data pattern with a low degree of difference, the determination being based on a comparison with a designated difference threshold, the first data block being a same data block as the second data block that includes the second data unit, the including of the first data unit in the first data block further comprising storing the first data unit in a memory at the determined sampling depth.

12. The system of claim 11, wherein the data analyzer is further configured to:

include the first data unit in a third data block in response to a determination that the test statistic characterizes a data pattern with a high degree of difference, the determination being based on a comparison with a designated difference threshold, the third data block being a different data block than the second data block that includes the second data unit.

13. The system of claim 11, wherein the test statistic characterizes a data pattern that is represented by a degree of difference between a first cumulative distribution function associated with the first data unit and a second cumulative distribution function of associated with the second data unit.

14. The system of claim 11, wherein the data analyzer is further configured to:

determine the sampling depth associated with the received plurality of data values, wherein the sampling depth identifies a size of each data unit of the plurality of data units, and wherein the sampling depth is determined based on a data pattern that is represented by s probability that the first data unit has a low degree of difference with the second data unit.

15. The system of claim 11, wherein the data analyzer is further configured to:

determine a plurality of representative data values associated with the plurality of data units, wherein each representative data value of the plurality of representative data values characterizes contents of a data unit of the plurality of data units.

16. The system of claim 15, wherein each representative data value of the plurality of representative data values is determined based on one of random sampling or determining a mean and variance for an associated data unit.

17. A method for reducing an amount of memory used to store data records representing network traffic, the method, comprising:

receiving a plurality of data values, wherein the plurality of data values is associated with a plurality of data units arranged as a plurality of data blocks;

determining, using a data analyzer, a test statistic based on at least some of the plurality of data units, the test statistic characterizing a data pattern that is represented by a degree of difference between a first data unit of the plurality of data units and at least a second data unit of the plurality of data units, the second data unit being received before the first data unit, the test statistic being determined based, at least in part, on a comparison of a first cumulative density function of the first data unit and a second cumulative density function of a second data block, the first data unit being sampled at a sampling depth determined based on a probability the first data unit and the second data unit are part of a same data distribution of streamed data, the probability being determined based, at least in part, on a comparison of the test statistic with previously generated test statistics of previously received data units including the second data unit; and including, using the data analyzer, the first data unit in a first data block in response to determining that the test statistic indicates a data pattern with a low degree of difference, the determining being based on a comparison with a designated difference threshold, the first data block being a same data block as the second data block that includes the second data unit the including of the first data unit in the first data block further comprising storing the first data unit in a memory at the determined sampling depth.

18. The method of claim 17 further comprising:

including the first data unit in a third data block in response to determining that the test statistic characterizes a data pattern with a high degree of difference, the determining being based on a comparison with a designated difference threshold, the third data block being a different data block than the second data block that includes the second data unit.

19. The method of claim 17, wherein the test statistic characterizes a data pattern that is represented by a degree of difference between a first cumulative distribution function associated with the first data unit and a second cumulative distribution function of associated with the second data unit.

20. The method of claim 19 further comprising:

determining a sampling depth associated with the received plurality of data values, wherein the sampling depth identifies a size of each data unit of the plurality of data units, and wherein the determining of the sampling depth is based on a data pattern that is represented by a probability that the first data unit has a low degree of difference with the second data unit.

* * * * *